United States Patent
Avidan Herman et al.

(10) Patent No.: US 10,819,756 B2
(45) Date of Patent: Oct. 27, 2020

(54) ATOMIC TRANSACTION OVER NON-PERSISTENT PROTOCOL(S)

(71) Applicant: OpenLegacy Technologies Ltd., Yehud (IL)

(72) Inventors: Zeev Avidan Herman, Givatayim (IL); Roi Mor, Kiryat Ono (IL); Yehoram Stein, Yehud (IL)

(73) Assignee: OpenLegacy Technologies Ltd., Yehud (IL)

( * ) Notice: Subject to any disclaimer, the term of this patent is extended or adjusted under 35 U.S.C. 154(b) by 727 days.

(21) Appl. No.: 15/483,509

(22) Filed: Apr. 10, 2017

(65) Prior Publication Data
US 2018/0295159 A1  Oct. 11, 2018

(51) Int. Cl.
| | |
|---|---|
| *G06F 15/16* | (2006.01) |
| *H04L 29/06* | (2006.01) |
| *H04L 29/08* | (2006.01) |
| *G06F 9/46* | (2006.01) |

(52) U.S. Cl.
CPC .......... *H04L 65/1069* (2013.01); *G06F 9/466* (2013.01); *H04L 67/02* (2013.01); *H04L 67/42* (2013.01); *H04L 67/142* (2013.01)

(58) Field of Classification Search
CPC ..... H04L 65/1069; H04L 67/02; H04L 67/42; H04L 67/142; G06F 9/466
USPC ......................................................... 709/203
See application file for complete search history.

(56) References Cited

U.S. PATENT DOCUMENTS

| | | | | |
|---|---|---|---|---|
| 6,003,085 | A | * 12/1999 | Ratner | ................... H04L 29/06 709/203 |
| 6,225,995 | B1 | 5/2001 | Jacobs | |
| 2010/0057840 | A1 | * 3/2010 | Schlusser | .......... H04L 29/08846 709/203 |

(Continued)

FOREIGN PATENT DOCUMENTS

WO          9923558 A1     5/1999

OTHER PUBLICATIONS

International Search Report / Written Opinion dated Jun. 14, 2018 in PCT Patent App. No. PCT/IB2018/052235, 13 pgs.

*Primary Examiner* — Oscar A Louie
*Assistant Examiner* — Oluwatosin M Gidado
(74) *Attorney, Agent, or Firm* — Matthew M. Hulihan; Heslin Rothenberg Farley & Mesiti PC

(57) ABSTRACT

A method receives from a client a request for server transaction processing, the request being a session request of an outer non-persistent session between the client and a server, the outer non-persistent session including the session request and a session response, the session request to initiate the outer non-persistent session and the session response to terminate the outer non-persistent session. The method commences processing of a server transaction on the server, the server transaction to be processed in transaction portions. The method initiates inner non-persistent session(s), each including (i) a session request providing a response to a client request to process a corresponding first transaction portion, and (ii) a session response providing a client request to process a corresponding second transaction portion. Based on termination of a final inner non-persistent session, the method provides the session response of the outer non-persistent session to terminate the outer non-persistent session.

23 Claims, 5 Drawing Sheets

(56) References Cited

U.S. PATENT DOCUMENTS

2010/0325630 A1\* 12/2010 Flood ..................... G06F 9/466
  718/101
2014/0156725 A1\* 6/2014 Mandyam ............... H04L 67/02
  709/203

\* cited by examiner

ATOMIC TRANSACTION OVER NON-PERSISTENT PROTOCOL(S)

BACKGROUND

In computer systems integration, the combining of several processes from one or more systems into one service may require transactional considerations in which all actions or other transaction portions must be either committed together or cancelled (referred to as a "rollback"), in which none are committed. Such practice may be important in order to ensure data integrity. Some systems, however, are accessed through client-server communication using a non-persistent protocol of requests and responses in which each request is committed upon completion (or wholly rolled-back). This prevents participation in larger transactional flows involving many transaction portions that are to be committed or rolled-back together.

SUMMARY

Shortcomings of the prior art are overcome and additional advantages are provided through the provision of a computer-implemented method. The method includes: receiving from a client a request for server transaction processing, the request being a session request of an outer non-persistent session between the client and a server, the outer non-persistent session comprising the session request by the client and a session response by the server, the session request to initiate the outer non-persistent session and the session response to terminate the outer non-persistent session; based on the receiving the session request, commencing processing of a server transaction on the server, the server transaction to be processed in a plurality of transaction portions; initiating one or more inner non-persistent sessions between the client and server, each inner non-persistent session of the one or more inner non-persistent sessions comprising (i) a session request, by the server to the client, that initiates the respective inner non-persistent session and provides a response to a client request to process a corresponding first transaction portion of the plurality of transaction portions, and (ii) a session response, received by the server from the client, that terminates the respective inner non-persistent session and provides a client request to process a corresponding second transaction portion of the plurality of transaction portions; and based on termination of a final inner non-persistent session of the one or more inner non-persistent sessions, providing to the client the session response of the outer non-persistent session to terminate the outer non-persistent session.

Further, a computer system is provided that is configured to perform a method, the method including: receiving from a client a request for server transaction processing, the request being a session request of an outer non-persistent session between the client and a server, the outer non-persistent session comprising the session request by the client and a session response by the server, the session request to initiate the outer non-persistent session and the session response to terminate the outer non-persistent session; based on the receiving the session request, commencing processing of a server transaction on the server, the server transaction to be processed in a plurality of transaction portions; initiating one or more inner non-persistent sessions between the client and server, each inner non-persistent session of the one or more inner non-persistent sessions comprising (i) a session request, by the server to the client, that initiates the respective inner non-persistent session and provides a response to a client request to process a corresponding first transaction portion of the plurality of transaction portions, and (ii) a session response, received by the server from the client, that terminates the respective inner non-persistent session and provides a client request to process a corresponding second transaction portion of the plurality of transaction portions; and based on termination of a final inner non-persistent session of the one or more inner non-persistent sessions, providing to the client the session response of the outer non-persistent session to terminate the outer non-persistent session.

Yet further, a computer program product is provided that includes a computer readable storage medium storing instructions for execution to perform a method. The method includes: receiving from a client a request for server transaction processing, the request being a session request of an outer non-persistent session between the client and a server, the outer non-persistent session comprising the session request by the client and a session response by the server, the session request to initiate the outer non-persistent session and the session response to terminate the outer non-persistent session; based on the receiving the session request, commencing processing of a server transaction on the server, the server transaction to be processed in a plurality of transaction portions; initiating one or more inner non-persistent sessions between the client and server, each inner non-persistent session of the one or more inner non-persistent sessions comprising (i) a session request, by the server to the client, that initiates the respective inner non-persistent session and provides a response to a client request to process a corresponding first transaction portion of the plurality of transaction portions, and (ii) a session response, received by the server from the client, that terminates the respective inner non-persistent session and provides a client request to process a corresponding second transaction portion of the plurality of transaction portions; and based on termination of a final inner non-persistent session of the one or more inner non-persistent sessions, providing to the client the session response of the outer non-persistent session to terminate the outer non-persistent session.

Additionally in some aspects, a method is provided that includes: providing to a server a request for server transaction processing, the request being a session request of an outer non-persistent session between a client and the server, the outer non-persistent session comprising the session request provided to the server and a session response by the server, the session request to initiate the outer non-persistent session and the session response to terminate the outer non-persistent session; based on commencement of processing of a server transaction on the server, the server transaction to be processed in a plurality of transaction portions, and for each inner non-persistent session of one or more inner non-persistent sessions between the client and server: receiving a session request, from the server, that initiates the respective inner non-persistent session and provides a response to a client request to process a corresponding first transaction portion of the plurality of transaction portions; and providing a session response to the server that terminates the respective inner non-persistent session and provides a client request to process a corresponding second transaction portion of the plurality of transaction portions; and receiving, based on termination of a final inner non-persistent session of the one or more inner non-persistent sessions, from the server the session response of the outer non-persistent session to terminate the outer non-persistent session.

In other aspects, a computer system is provided that is configured to perform a method, the method including: providing to a server a request for server transaction processing, the request being a session request of an outer non-persistent session between a client and the server, the outer non-persistent session comprising the session request provided to the server and a session response by the server, the session request to initiate the outer non-persistent session and the session response to terminate the outer non-persistent session; based on commencement of processing of a server transaction on the server, the server transaction to be processed in a plurality of transaction portions, and for each inner non-persistent session of one or more inner non-persistent sessions between the client and server: receiving a session request, from the server, that initiates the respective inner non-persistent session and provides a response to a client request to process a corresponding first transaction portion of the plurality of transaction portions; and providing a session response to the server that terminates the respective inner non-persistent session and provides a client request to process a corresponding second transaction portion of the plurality of transaction portions; and receiving, based on termination of a final inner non-persistent session of the one or more inner non-persistent sessions, from the server the session response of the outer non-persistent session to terminate the outer non-persistent session.

A computer program product is also provided that includes a computer readable storage medium storing instructions for execution to perform a method. The method includes: providing to a server a request for server transaction processing, the request being a session request of an outer non-persistent session between a client and the server, the outer non-persistent session comprising the session request provided to the server and a session response by the server, the session request to initiate the outer non-persistent session and the session response to terminate the outer non-persistent session; based on commencement of processing of a server transaction on the server, the server transaction to be processed in a plurality of transaction portions, and for each inner non-persistent session of one or more inner non-persistent sessions between the client and server: receiving a session request, from the server, that initiates the respective inner non-persistent session and provides a response to a client request to process a corresponding first transaction portion of the plurality of transaction portions; and providing a session response to the server that terminates the respective inner non-persistent session and provides a client request to process a corresponding second transaction portion of the plurality of transaction portions; and receiving, based on termination of a final inner non-persistent session of the one or more inner non-persistent sessions, from the server the session response of the outer non-persistent session to terminate the outer non-persistent session.

In an additional aspect, a method is provided that includes performing transaction processing for processing a server transaction in a plurality of transaction portions, the performing transaction processing comprising: performing processing of an outer non-persistent session between a client and a server, the outer non-persistent session comprising a session request to initiate the outer non-persistent session and request server transaction processing, and a session response to terminate the outer non-persistent session; performing processing of one or more inner non-persistent sessions between the client and the server, each inner non-persistent session of the one or more inner non-persistent sessions comprising (i) a session request to initiate the respective inner non-persistent session and provide a response to a client request to process a corresponding first transaction portion of the plurality of transaction portions, and (ii) a session response to terminate the respective inner non-persistent session and provide a client request to process a corresponding second transaction portion of the plurality of transaction portions; and based on termination of a final inner non-persistent session of the one or more inner non-persistent sessions, terminating processing of the outer non-persistent session between the client and the server based on communication of the session response of the outer non-persistent session to the server.

In some aspects, the outer non-persistent session comprises communication between the client and the server using a first non-persistent communication protocol, and at least one inner non-persistent session of the one or more inner non-persistent sessions comprises communication between the client and the server using a second non-persistent communication protocol.

The first non-persistent communication protocol and the second non-persistent communication protocol can be a same non-persistent communication protocol or can be different non-persistent communication protocols.

In some aspects, the first non-persistent communication protocol comprises Hypertext Transfer Protocol (HTTP) and/or the second non-persistent communication protocol comprises Hypertext Transfer Protocol (HTTP).

The session response of the final inner non-persistent session can provide the client request to process the corresponding second transaction portion of the plurality of transaction portions, and the session response of the outer non-persistent session can provide a response to the client request to process the corresponding second transaction portion. Additionally, the session response, received by the server from the client, of the final inner non-persistent session can comprise a client commit request for the transaction or client rollback request for the transaction, and the session response of the outer non-persistent session can comprise an acknowledgement of a commit of the transaction or a rollback of the transaction.

The method can further comprise receiving a token from the client as part of the session request of the outer non-persistent session, and providing the token to the client with each session request of the one or more inner non-persistent sessions to facilitate correlation of each session request of the one or more inner non-persistent sessions to the outer non-persistent session.

Transaction processing of the transaction can remain open while any of the one or more inner non-persistent sessions remains open.

In particular embodiments, each session response, of the one or more inner non-persistent sessions, received from the client can comprise a client request to execute one or more user programs on the server as part of the server transaction.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Described herein are aspects that enable persistence in systems in a transaction processing environment, allowing these systems to participate in transactions having several transaction portions invoked by several requests over a non-persistent communication protocol. This provides a way to accomplish several transactional changes on a server side and commit them (or rollback) all at once as an atomic operation, all using one or more non-persistent communication protocol(s), an example of which is Hypertext Transport Protocol (HTTP).

Figure 1:
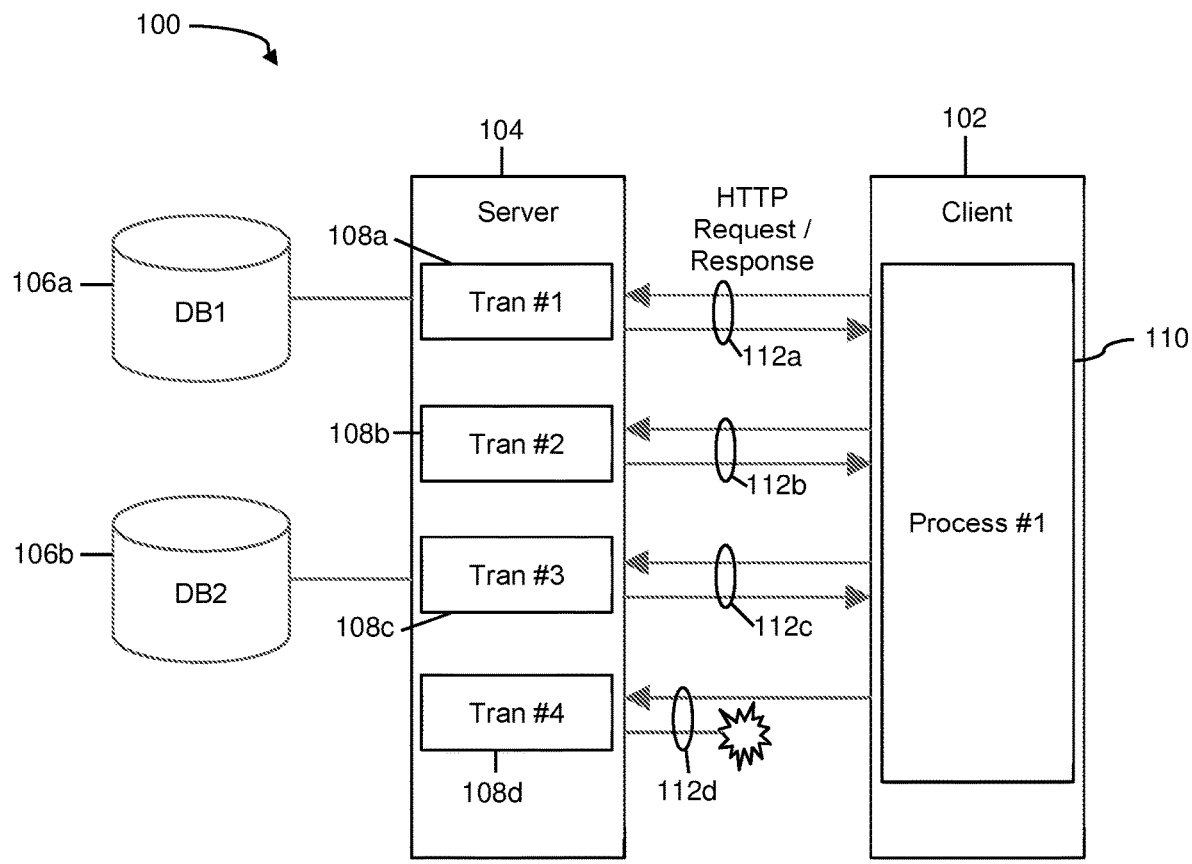
FIG. 1 depicts example communications between a client and server using a non-persistent protocol.

A conventional approach that orchestrates the transaction using a non-persistent communication protocol results in problems keeping data integrity while. FIG. 1 depicts a flow of communications between a client and server using a non-persistent communication protocol such as HTTP requests/responses. Shown in FIG. 1 is a computing environment 100 having a client 102 and server 104 communicating HTTP requests/responses across communications link(s), for instance over one or more networks. Server 104 is also in communication with first database 106a and second database 106b over communications links. Data may be written to and/or accessed from 106a, 106b in the processing of four transactions 108a, 108b, 108c, 108d.

Client 102 performs a process 110, which may correlate to the execution of one or more process(es) comprising executable program instructions on client 102. Process 110 invokes transaction processing on the server side. Server 104 is a transaction server. An example transaction server is a Customer Information Control System (CICS) transaction server offered by International Business Machines Corporation, Armonk, N.Y., U.S.A. (of which CICS may be a trademark). Because client 102 and server 104 communicate using a non-persistent type of communication protocol in this example, which may be the only type of communication protocol available as between the two systems, or which may be desired or forced for any of various reasons, processing of a transaction extends only for the life of a corresponding HTTP request/response pair. Request response pairs 112a, 112b, 112c, 112d each include an HTTP request made from client 102 to server 104 and an HTTP response made from server 104 to client 102. The client sends a request to the server, the server receives the request then performs processing, and provides a response back to the client. The client receives the response from the server and processing (110) continues.

Each request/response pair corresponds to a transaction and vice versa. Transaction 108a corresponds with request/response pair 112a; the client request of 112a requests something that the server performs as a transaction 108a. The server response of 112a is a response to that request, usually with a result of the transaction processing and usually an indication of whether the transaction was committed. Thus, when each HTTP request is made from the client, it is received by the server and processed. After or when the corresponding response is sent back to client, the server transaction (e.g. 108a) is completed and all changes are committed if there were no issues. Alternatively, the transaction may be rolled-back for any of various reasons.

If one of the transactions fails, as in the example of 108d in FIG. 1 indicated by the response of request/response pair 112d, the changes made by the transaction may be rolled-back. However, in this scenario all of the changes made by the prior transactions 108a, 108b, 108c as part of process 110 would remain committed. This may be disadvantageous because it could lead to a data integrity problem.

Figure 2:
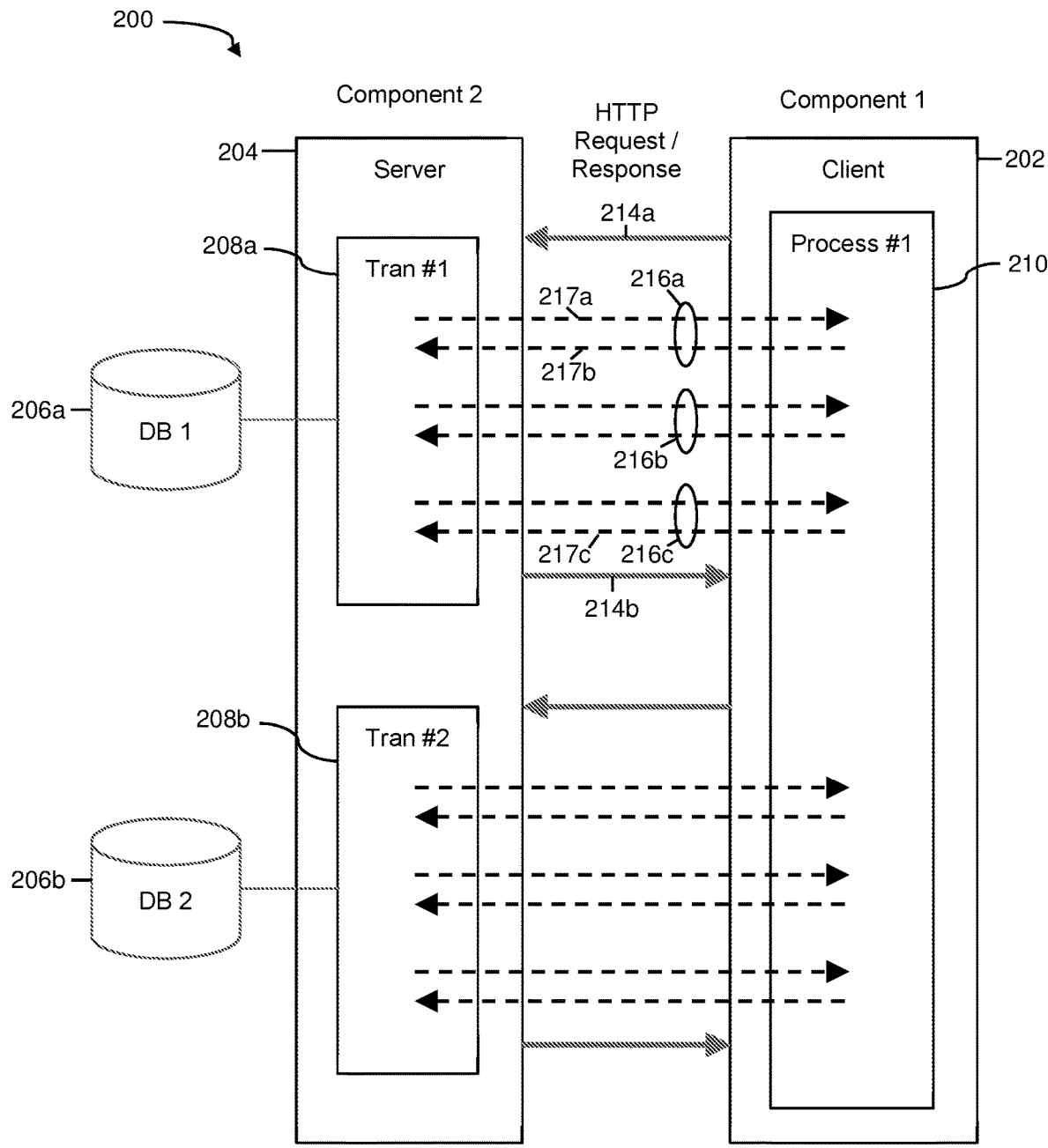
FIG. 2 depicts example persistent communications between a client and server over a non-persistent communication protocol for an atomic transaction, in accordance with aspects described herein.

A role switching approach using non-persistent protocol (s) is provided to achieve desired persistence in transaction processing, even that which includes multiple transaction portions to be committed or rolled-back together. FIG. 2 depicts example persistent communications between a client and server over a non-persistent communication protocol, such as HTTP, for an atomic transaction, in accordance with aspects described herein.

FIG. 2 shows a computing environment 200 with component 1 (202) and component 2 (204), in which component 1 is a client computer system and component 2 is a transaction server in communication with component 1, first database 206a, and second database 206b over communication links. Component 1 (202) preforming process 210 and acting as a client initiates a conversation with component 2 (204) using an HTTP request 214a. The request 214a may include a unique token, such as an arbitrary unique string of characters or hexadecimal digits, for reasons explained below. The initial request 214a may be a request to process some transaction portion, such as a request to change data in a database or a request for some other business process, as examples.

This initial request 214a by component 1 (the client computer system) initiates an 'outer' non-persistent HTTP session. Non-persistent session refers to a request/response communication session using a non-persistent type of communication protocol, in this example HTTP. This outer non-persistent session begins with HTTP request 214a and eventually ends with an HTTP response (214b) from component 2 (acting as the transaction server). Component 2 acting as the transaction server may perform the processing to fulfill the request 214a made by the client, which processing may include commencing processing of server transaction 208a. Instead of the transaction server (component 2, 204) returning at that point the HTTP response to HTTP request 214a as a server, in accordance with aspects described herein component 2 initiates a new session—an 'inner' non-persistent session 216a between component 2 and component 1. The inner non-persistent session 216a includes an HTTP request 217a made from component 2 (transaction server) to component 1 (client) and an HTTP response 217b made from component 1 (client) to component 2 (transaction server). The HTTP request 217a from component 2 to component 1 is a request (in the protocol sense) that may provide some response to component 1's initial request 214a, e.g. to start transaction processing. Thus, with respect to the inner non-persistent session 216a, component 2 is a requesting client and component 1 is the responding server. The token initially sent from component 1 to component 2 as part of HTTP request 214a may be returned to component 1 with HTTP request 217a so that component 1 can correlate inner non-persistent session 216a to the outer non-persistent session established by request 214a.

As noted, the HTTP request 217a from component 2 to component 1 may provide a response to whatever was requested in component 1's initial HTTP request 214a. For instance, HTTP request 217a may be an acknowledgement that a program has commenced running or may be a response that contains data that was requested by component 1, as examples.

Component 1 receives the HTTP request 217a and matches it to its own request 214a using the token, thus treating it as a server response to that request. The server responses may be an indication of a result of processing the first transaction portions, or may be an indication that the server is ready to accept a next transaction portion processing request, as examples. Component 1 then sends another request to component 2, this time as an HTTP response 217b to component 2's HTTP request 217a, and part of inner non-persistent session 216a.

Additional inner non-persistent sessions (216b, 216c) can be initiated and completed to accomplish additional request/response activity between the client and server to process additional transaction portions (any unit of work involved in a transaction) of an overall transaction 208a. A given inner non-persistent session includes a session request, made by component 2 (the transaction server) to component 1 (the client computer system) that initiates the inner non-persistent session and provides a response to a client request to process a corresponding transaction portion. For instance, inner non-persistent session 216a includes HTTP request 217a that provides a response to component 1's request (in the form of 214a) to, e.g., initiate execution of a program, change data in a database, or to request some other business process, as examples, which may be a first transaction portion of transaction 208a. A given inner non-persistent session also includes a session response, made by component 1 (the client computer system) to component 2 (the transaction server) that terminates that inner non-persistent session and provides a request to process another transaction portion. For instance, inner non-persistent session 216a includes HTTP response 217b that provides a protocol response to component 2's request 217a, and includes Component 1's request to process a next transaction portion of transaction 208a, e.g., make changes in a database, as an example.

Following the sequence of requests/responses in FIG. 2: component 2's HTTP request of the next inner non-persistent session 216b is a response to component 1's transaction processing request made by 217b of the immediately preceding inner non-persistent session 216a; component 1's HTTP response of inner non-persistent session 216b is a next request to process a next transaction portion of transaction 208a; component 2's HTTP request of the next inner non-persistent session 216c is a response to component 1's transaction processing request made in the HTTP response of session 216b; and component 1's HTTP response 217c of inner non-persistent session 216c is a next request. This can continue for as many inner non-persistent sessions as desired. With each architected inner HTTP request being made by component 2 (which as described will be some response to a component 1 request) the token may be provided to component 1 each time so that component 1 knows that the inner request corresponds to the outer HTTP session. This enables the client to engage in several outer HTTP sessions, each with respective inner sessions, with one or more servers, and the tokens provide a way for the client to correlate requests/responses of inner sessions to the correct outer session.

The inner non-persistent sessions include communications in which the transaction server's (204) role from the protocol perspective is that of a client and the client computer system's (202) role from the protocol perspective is that of a server. Transaction processing continues in transaction portions while the original HTTP request (214a) remains 'unanswered' in the sense that a corresponding architected HTTP response has not yet been delivered. The transaction remains active, i.e. not terminated or committed.

At the appropriate time, for instance after the processing of all of component 1's requests for a single transactional unit has been made, component 1 sends a request to perform a commit (or perhaps rollback) for the transaction. The request may be provided as an HTTP response of an inner non-persistent session, and more specifically as the last inner HTTP response before the server terminates the outer HTTP session. Referring still to FIG. 2, HTTP response 217c may be component 1's request for the transaction server to commit the changes of transaction 208a. Component 2 receives the request 217c as part of final inner non-persistent session 216c, performs the commit or rollback as the case may be, and responds to component 1, the client. The response is an HTTP response as a server, and specifically the HTTP response 214b to the original request 214a. This can also terminate the transaction 208a, meaning commit or rollback to stop the transaction.

In a specific example in which the transaction is rolled-back at any point by the server, for instance because of a server issue, rather than by initiation by the client component 1, the transaction server (component 2) can determine to perform the rollback and notify the client of the needed rollback by way of the outer HTTP response (e.g. 214b), which will close the outer session. In a particular example, the outer HTTP response is an HTTP 500 error (internal server error) that terminates the outer non-persistent session.

FIG. 2 also shows another transaction 208b that may be effected in a manner as described above for transaction 208a. As depicted, both transactions may be performed on behalf of common process 210 of the client. Additionally or alternatively, a process (such as process 210 of FIG. 2) when running may engage in transaction(s) and send/receive request(s) with potentially several servers (e.g. in addition to component 2 204 of FIG. 2). Such interactions may be effected in the manner described for transaction 208a, e.g. using non-persistent methods, or using persistent methods, or a combination of non-persistent and persistent methods. In this way, the orchestration may involve many different participants, including the client and multiple servers who may each be communicating with the client through persistent session(s), non-persistent session(s), and/or a combination of the two.

In a particular example, server 204 is an adapter for running user programs on a legacy system and client 202 requests the server 204 to run user program(s) on server 204. The first request 214a is a request by the client that the server initiate the execution of the user program. The user program may change data in first and second databases 206a, 206b. The server's communication back to the client at that point is not the last communication before transaction completion (as it was in FIG. 1) but instead is a first inner session HTTP request from the server, which initiates an inner non-persistent session. Then, subsequent client requests to the server for transaction processing, which requests are in the form of architected HTTP responses, may include requests to run different user program(s) on the server.

It is seen by the above that server-side changes, such as launching program(s), writing data, etc., have been performed as part of a single transaction and are committed or rolled-back at the same time, together. Any one or more non-persistent communication protocol(s) may be used for the inner and outer sessions. The outer non-persistent session can include communication that uses the same or different non-persistent communication protocol than that used by the inner non-persistent sessions.

In some examples, each "transaction" might involve incremental commits happening based on inner session(s). In other words, there may be commits initiated by the client and occurring within a single transaction to complete different units of work but not necessarily the entire "transaction". A rollback in that case would roll-back only changes since the last commit. All of those potentially several commits could occur within an outer HTTP session.

In an alternative embodiment to that depicted in FIG. 2, there may be multiple transactions, perhaps each including several transaction portions, committed all within one outer non-persistent session. In such an example, the HTTP response (214b) and HTTP request from component 1 to component 2 to initiate transaction 208b would not exist. However, there may be an additional communication from client component 1 to server component 2 in order for the client to provide whatever request for processing it wants in order to begin the transaction 208b. Alternatively, client HTTP response 217c may be a request that causes server 204 to begin processing transaction 2 208b.

Figure 3:
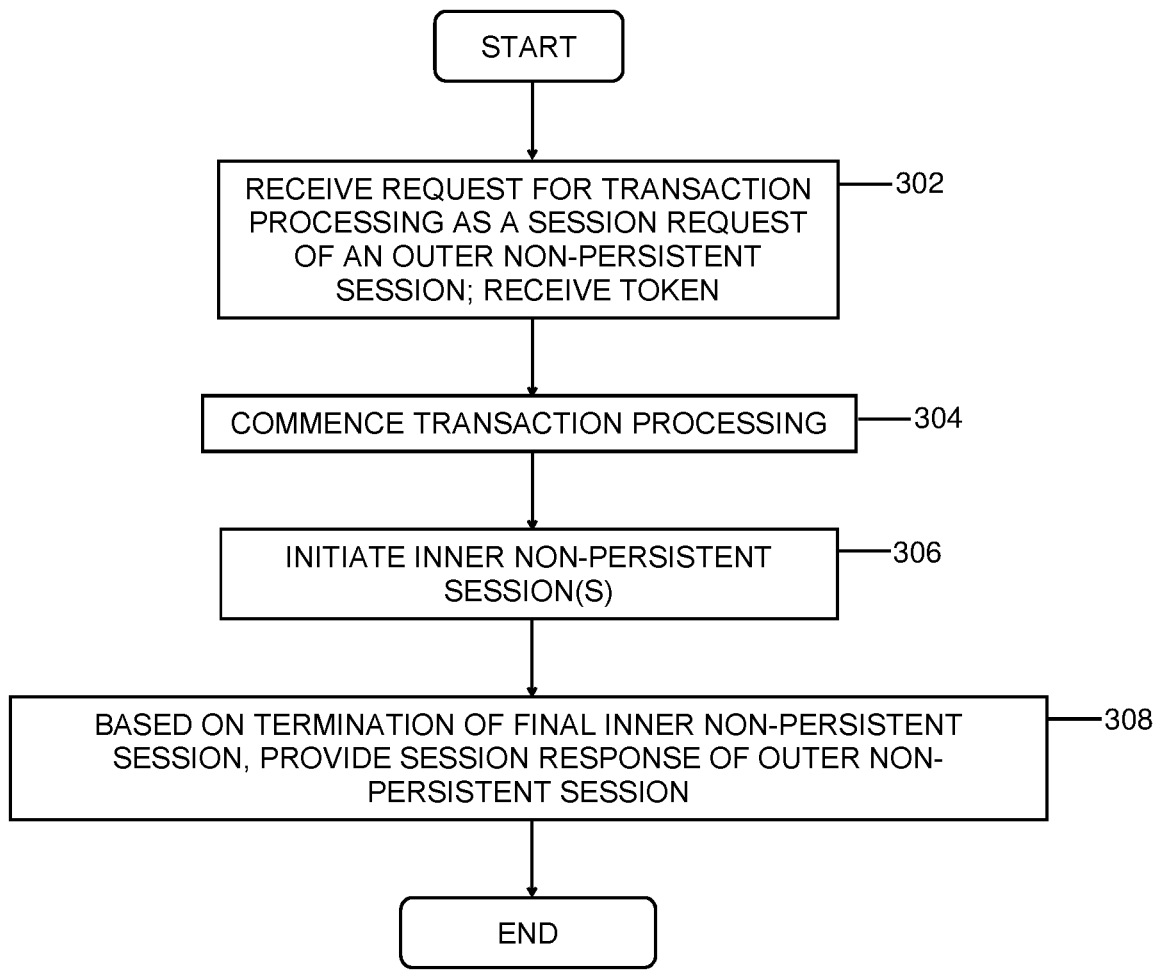
FIG. 3 depicts an example process for an atomic transaction over a non-persistent protocol from a server perspective, in accordance with aspects described herein.

FIG. 3 depicts an example process for an atomic transaction over a non-persistent protocol from a server perspective, in accordance with aspects described herein. In some examples, the process is performed by one or more computer systems, such as those described herein, which may include one or more computer systems acting as a transaction server.

The process begins by receiving from a client a request for server transaction processing (302). The request is a session request of an outer non-persistent session between the client and a server, and the outer non-persistent session includes the session request by the client and a session response by the server. The session request is to initiate the outer non-persistent session and the session response is to terminate the outer non-persistent session. Also received from the client, either as part of the session request or separately, is a token.

Based on receiving the session request, the process of FIG. 3 commences processing of a server transaction on the server (304), the server transaction to be processed in a plurality of transaction portions. Then the server initiates sequentially, as part of request/response communications with the client, one or more inner non-persistent sessions (306) between the client and server. Each inner non-persistent session of the one or more inner non-persistent sessions includes (i) a session request, by the server to the client, that initiates the respective inner non-persistent session and provides a response to a client request to process a corresponding first transaction portion of the plurality of transaction portions, and (ii) a session response, received by the server from the client, that terminates the respective inner non-persistent session and provides a client request to process a corresponding second, or next, transaction portion of the plurality of transaction portions. In some embodiments, the server provides the token to the client with each session request of the one or more inner non-persistent sessions to facilitate the client's correlation of each session request of the one or more inner non-persistent sessions to the outer non-persistent session.

In this manner, the session request of a given inner session may be a response, by the transaction server to the client, to a client's request. The client's request may have come in the form of an initial outer session request (in the case of a sequentially-first inner session between server and client) or a session response of the immediately preceding inner session between the client and server. For instance, as described above with reference to FIG. 2, 214a (outer session request) may be a request to initiate a transaction/process an initial transaction portion, and inner session responses, such as 217b and subsequent inner session responses by the client to the server, may be additional requests to process additional transaction portions. The server's inner session requests (e.g. 217a, etc.) are responses to these client requests to process transaction portions. Thus, in the above, the "first" transaction portion may refer to the portion of the transaction that was most recently requested by the client, which is what the server is responding to by sending the inner session request. The "second" transaction portion may refer to the next transaction portion to be processed, and the session response from the client to the server may be the client's request to the server to process that next transaction portion. Referring to FIG. 2, for inner session 216a, the session request 217a is the server's response to the client's request (214a) to process one transaction portion, such as to initiate the transaction, and the session response 217b is the client's request to the server to process the next transaction portion. The server's inner session request in session 216b will be the server's response the client's request (made by 217b) to process that next transaction portion, and so forth.

With respect to the final inner session (e.g. 216c in FIG. 2), the session response (217c) of the final inner non-persistent session (216c) provides the client request to process the corresponding second transaction portion of the plurality of transaction portions, and the session response (214b) of the outer non-persistent session provides a response to the client request to process the corresponding second transaction portion. In this case, the session response (e.g. 217c), received by the server from the client, of the final inner non-persistent session can include a client commit request for the transaction or client rollback request for the transaction, where the session response (e.g. 214b) of the outer non-persistent session includes an acknowledgement, by the server, of a commit of the transaction or a rollback of the transaction.

Thus, eventually the client (or perhaps the server if there was a server-side issue) will determine to terminate the transaction, and this is effected in part in conjunction with the termination of the final inner non-persistent session. Referring back to FIG. 3, based on termination of a final inner non-persistent session of the one or more inner non-persistent sessions, the process provides to the client the session response of the outer non-persistent session to terminate the outer non-persistent session (308).

The transaction processing of the transaction can remain open while any of the one or more inner non-persistent sessions remains open. For instance, the outer session request may cause a transaction to be opened, and the transaction may not be closed until after the final inner session has been terminated.

The non-persistent communications protocol(s) used for the outer and inner sessions can be any non-persistent communication protocol desired, and may be the same or different. Thus, the outer non-persistent session can include communication between the client and the server using a first non-persistent communication protocol, and at least one inner non-persistent session of the one or more inner non-persistent sessions can include communication between the client and the server using a second non-persistent communication protocol, and the first non-persistent communication protocol and the second non-persistent communication protocol may be different non-persistent communication protocols. Additional protocols may be used for other inner sessions. Alternatively, the first non-persistent communication protocol and the second non-persistent communication protocol may be a same non-persistent communication protocol. In particular examples, the first non-persistent communication protocol includes or is Hypertext Transfer Protocol (HTTP) or the second non-persistent communication protocol includes or is HTTP, or both the first and second non-persistent communication protocols includes or is HTTP.

In a particular embodiment, each session response, of the one or more inner non-persistent sessions, received by the server from the client includes a client request to execute one or more user programs on the server as part of the server transaction. In this regard, the transaction portions that make up the transaction may include execution of user program(s).

Figure 4:
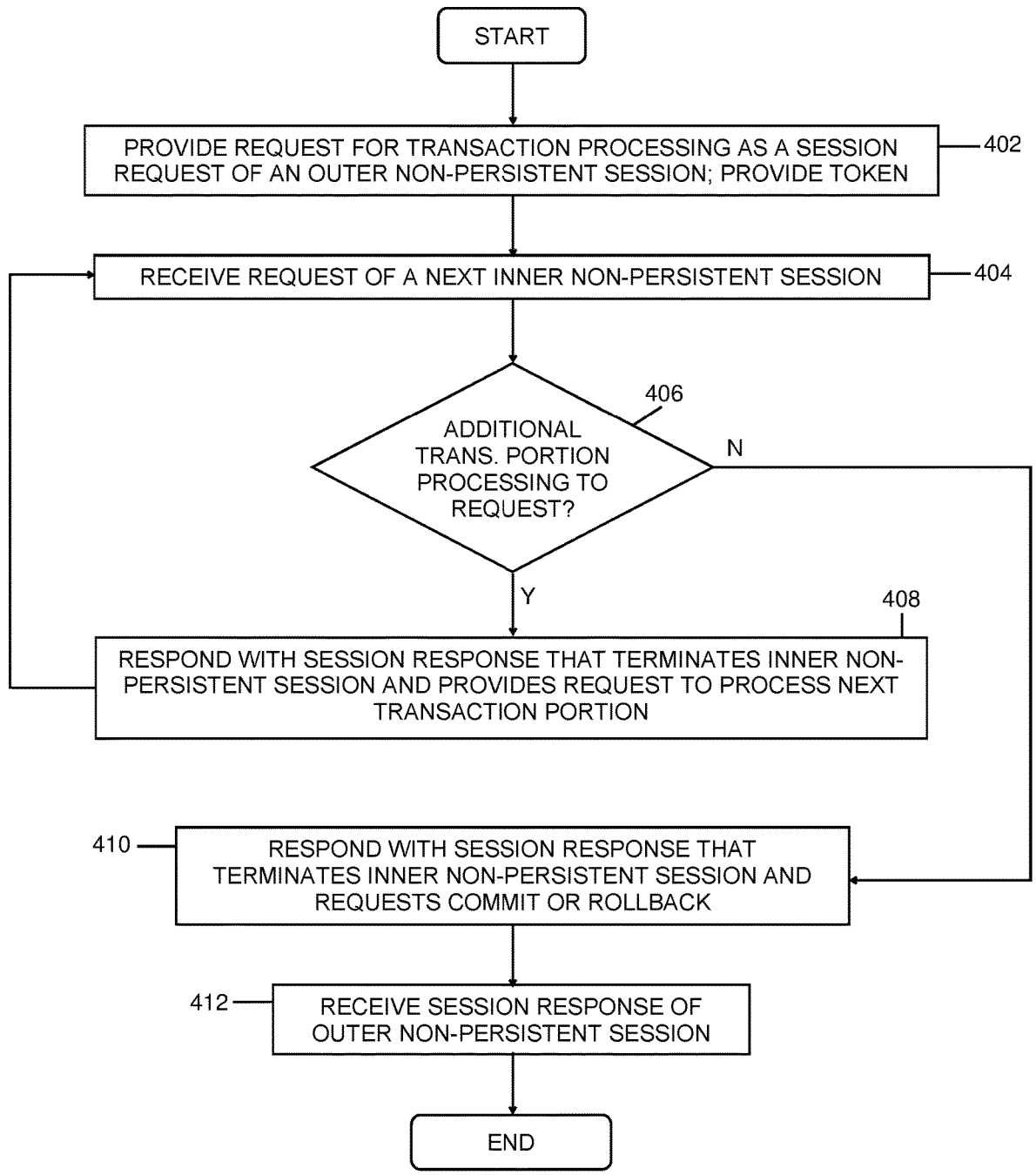
FIG. 4 depicts an example process for an atomic transaction over a non-persistent protocol from a client perspective, in accordance with aspects described herein.

FIG. 4 depicts an example process for an atomic transaction over a non-persistent protocol from a client perspective, in accordance with aspects described herein. In some examples, the process is performed one or more computer systems, such as those described herein, which may include one or more computer systems acting as a client initiating transaction server processing.

The process begins by providing to a server a request for server transaction processing, the request being a session request of an outer non-persistent session between a client and the server (402). The outer non-persistent session can include (i) the session request provided to the server, where the session request is to initiate the outer non-persistent session, and (ii) a session response by the server, the session response to terminate the outer non-persistent session. Additionally, the client can provide a token as part of the session request of the outer non-persistent session.

This initial request by the client can initiate commencement of processing of a server transaction on the server, the server transaction to be processed in a plurality of transaction portions. Based on that commencement, the server might initiate a sequence of inner non-persistent sessions with the client by issuing inner session requests to the client. For each such inner non-persistent session of one or more inner non-persistent sessions between the client and server, the following may be performed: Initially, the client receives a session request, from the server, that initiates the respective inner non-persistent session (404). This also provides a response to a client request to process a corresponding first transaction portion of the plurality of transaction portions. For instance, it is the server's response to the client's immediately preceding request to process the first transaction portion. The process of FIG. 4 continues by determining whether there is additional transaction portion processing to request (406), i.e. whether there are additional transaction portions to be processed by the server. If yes, then the process continues to (408) where the client provides a session response to the server that terminates the respective inner non-persistent session and provides a client request to process a corresponding second (i.e. the next) transaction portion of the plurality of transaction portions (408). At that point, the process returns to 404, with the client waiting for the server's response to that request, which response will likely come in the form of a new inner session request, or perhaps the server's response to the outer session if there was an error.

At some point after receiving a server response (in the form of an inner session request), the client decides to commit or rollback the changes of the transaction. This is handled by inquiry 406; if there is no other transaction portion processing to request other than the commit or rollback, the process will answer inquiry 406 in the negative (i.e. 406, N) and proceed to respond to the server with an inner session response that terminates the current inner non-persistent session (which will be the final one in the sequence) and requests the commit or rollback (410). Thus, that session response by the client terminates the final inner non-persistent session of the one or more inner sessions.

The process then proceeds by receiving, from the server, based on termination of the final inner non-persistent session of the one or more inner non-persistent sessions, the session response of the outer non-persistent session to terminate the outer non-persistent session (412).

Although various examples are provided, variations are possible without departing from a spirit of the claimed aspects.

Figure 5:
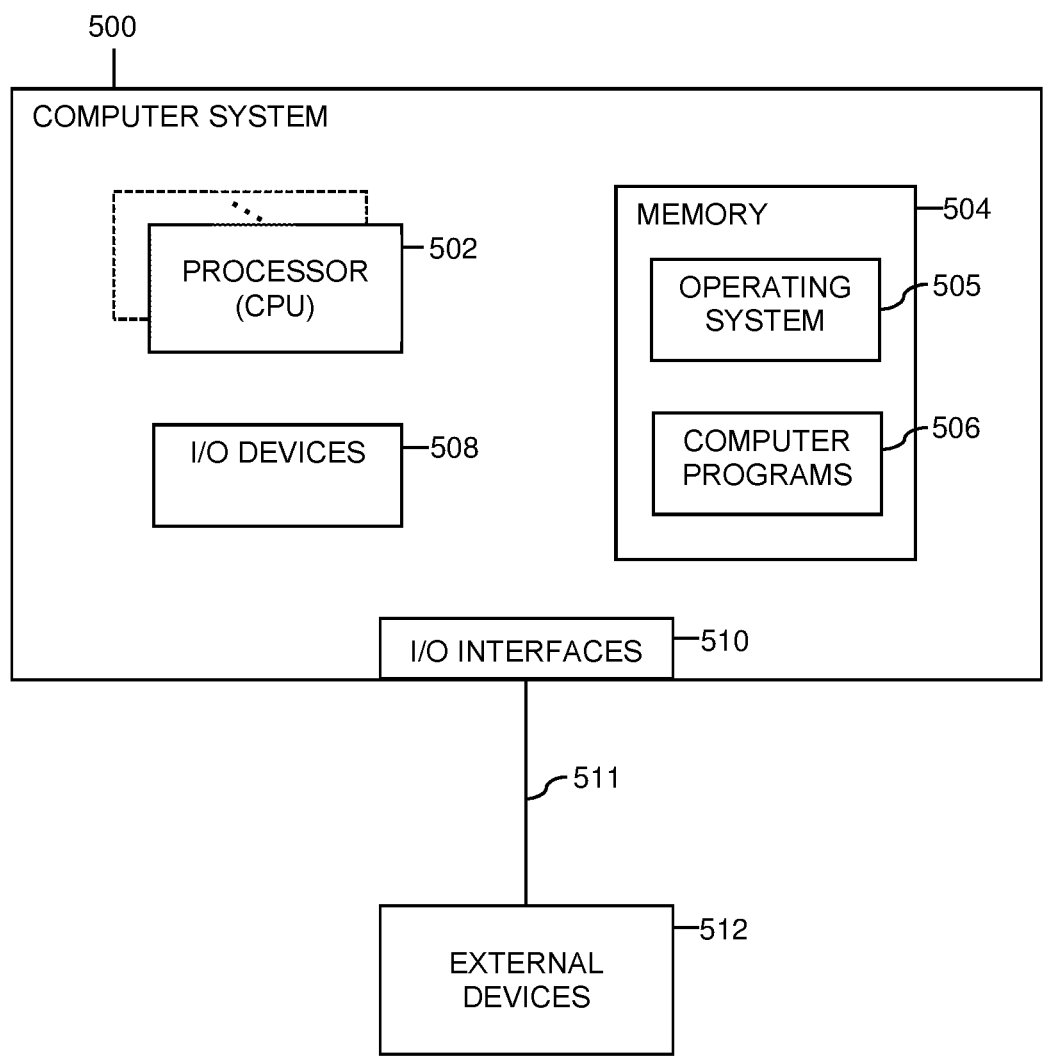
FIG. 5 depicts one example of a computer system and associated devices to incorporate and/or use aspects described herein.

Processes described herein may be performed singly or collectively by one or more computer systems, such as one or more client computer systems, one or more transaction servers, or a combination of the foregoing, as examples. FIG. 5 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by Intel Corporation (Santa Clara, Calif., USA) or ARM Holdings plc (Cambridge, England, United Kingdom), as examples.

FIG. 5 shows a computer system 500 in communication with external device(s) 512. Computer system 500 includes one or more processor(s) 502, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 502 can also include register(s) to be used by one or more of the functional components. Computer system 500 also includes memory 504, input/output (I/O) devices 508, and I/O interfaces 510, which may be coupled to processor(s) 502 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 504 can be or include main or system memory (e.g. Random Access Memory) used in the execution of program instructions, storage device(s) such as hard drive(s), flash media, or optical media as examples, and/or cache memory, as examples. Memory 504 can include, for instance, a cache, such as a shared cache, which may be coupled to local caches (examples include L1 cache, L2 cache, etc.) of processor(s) 502. Additionally, memory 504 may be or include at least one computer program product having a set (e.g., at least one) of program modules, instructions, code or the like that is/are configured to carry out functions of embodiments described herein when executed by one or more processors.

Memory 504 can store an operating system 505 and other computer programs 506, such as one or more computer programs/applications that execute to perform aspects described herein. Specifically programs/applications can include computer readable program instructions that may be configured to carry out functions of embodiments of aspects described herein.

Examples of I/O devices 508 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (512) coupled to the computer system through one or more I/O interfaces 510.

Computer system 500 may communicate with one or more external devices 512 via one or more I/O interfaces 510. Example external devices include a keyboard, a pointing device, a display, and/or any other devices that enable a user to interact with computer system 500. Other example external devices include any device that enables computer system 500 to communicate with one or more other computing systems or peripheral devices such as a printer. A network interface/adapter is an example I/O interface that enables computer system 500 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 510 and external devices 512 can occur across wired and/or wireless communications link(s) 511, such as Ethernet-based wired or wireless connections. Example wireless connections include cellular, Wi-Fi, Bluetooth®, proximity-based, near-field, or other types of wireless connections. More generally, communications link(s) 511 may be any appropriate wireless and/or wired communication link(s) for communicating data.

Particular external device(s) 512 may include one or more data storage devices, which may store one or more programs, one or more computer readable program instructions, and/or data, etc. Computer system 500 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 500 may be operational with numerous other general purpose or special purpose computing system environments or configurations. Computer system 500 may take any of various forms, well-known examples of which include, but are not limited to, personal computer (PC) system(s), server computer system(s), thin client(s), thick client(s), workstation(s), laptop(s), handheld device(s), mobile device(s)/computer(s) such as smartphone(s), tablet (s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

The present invention may be a system, a method, and/or a computer program product, any of which may be configured to perform or facilitate aspects described herein.

In some embodiments, aspects of the present invention may take the form of a computer program product, which may be embodied as computer readable medium(s). A computer readable medium may be a tangible storage device/medium having computer readable program code/instructions stored thereon. Example computer readable medium(s) include, but are not limited to, electronic, magnetic, optical, or semiconductor storage devices or systems, or any combination of the foregoing. Example embodiments of a computer readable medium include a hard drive or other mass-storage device, an electrical connection having wires, random access memory (RAM), read-only memory (ROM), erasable-programmable read-only memory such as EPROM or flash memory, an optical fiber, a portable computer disk/diskette, such as a compact disc read-only memory (CD-ROM) or Digital Versatile Disc (DVD), an optical storage device, a magnetic storage device, or any combination of the foregoing. The computer readable medium may be readable by a processor, processing unit, or the like, to obtain data (e.g. instructions) from the medium for execution. In a particular example, a computer program product is or includes one or more computer readable media that includes/stores computer readable program code to provide and facilitate one or more aspects described herein.

As noted, program instruction contained or stored in/on a computer readable medium can be obtained and executed by any of various suitable components such as a processor of a computer system to cause the computer system to behave and function in a particular manner. Such program instructions for carrying out operations to perform, achieve, or facilitate aspects described herein may be written in, or compiled from code written in, any desired programming language. In some embodiments, such programming language includes object-oriented and/or procedural programming languages such as C, C++, C#, Java, etc.

Program code can include one or more program instructions obtained for execution by one or more processors. Computer program instructions may be provided to one or more processors of, e.g., one or more computer systems, to produce a machine, such that the program instructions, when executed by the one or more processors, perform, achieve, or facilitate aspects of the present invention, such as actions or functions described in flowcharts and/or block diagrams described herein. Thus, each block, or combinations of blocks, of the flowchart illustrations and/or block diagrams depicted and described herein can be implemented, in some embodiments, by computer program instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
    receiving from a client a request for server transaction processing, the request being a session request of an outer non-persistent session between the client and a server, the outer non-persistent session comprising the session request by the client and a session response by the server, the session request to initiate the outer non-persistent session and the session response to terminate the outer non-persistent session;
    based on the receiving the session request, commencing processing of a server transaction on the server, the server transaction to be processed in a plurality of transaction portions;
    initiating one or more inner non-persistent sessions between the client and server, each inner non-persistent session of the one or more inner non-persistent sessions comprising (i) a session request, by the server to the client, that initiates the respective inner non-persistent session and provides a response to a client request to process a corresponding first transaction portion of the plurality of transaction portions, and (ii) a session response, received by the server from the client, that terminates the respective inner non-persistent session and provides a client request to process a corresponding second transaction portion of the plurality of transaction portions; and
    based on termination of a final inner non-persistent session of the one or more inner non-persistent sessions, providing to the client the session response of the outer non-persistent session to terminate the outer non-persistent session.

2. The method of claim 1, wherein the outer non-persistent session comprises communication between the client and the server using a first non-persistent communication protocol, and at least one inner non-persistent session of the one or more inner non-persistent sessions comprises communication between the client and the server using a second non-persistent communication protocol.

3. The method of claim 2, wherein the first non-persistent communication protocol and the second non-persistent communication protocol are a same non-persistent communication protocol.

4. The method of claim 2, wherein the first non-persistent communication protocol and the second non-persistent communication protocol are different non-persistent communication protocols.

5. The method of claim 2, wherein the first non-persistent communication protocol comprises Hypertext Transfer Protocol (HTTP) or the second non-persistent communication protocol comprises Hypertext Transfer Protocol (HTTP).

6. The method of claim 1, wherein the session response of the final inner non-persistent session provides the client request to process the corresponding second transaction portion of the plurality of transaction portions, and wherein the session response of the outer non-persistent session provides a response to the client request to process the corresponding second transaction portion.

7. The method of claim 6, wherein the session response, received by the server from the client, of the final inner non-persistent session comprises a client commit request for the transaction or client rollback request for the transaction, and wherein the session response of the outer non-persistent session comprises an acknowledgement of a commit of the transaction or a rollback of the transaction.

8. The method of claim 1, further comprising receiving a token from the client as part of the session request of the outer non-persistent session, and providing the token to the client with each session request of the one or more inner non-persistent sessions to facilitate correlation of each session request of the one or more inner non-persistent sessions to the outer non-persistent session.

9. The method of claim 1, wherein transaction processing of the transaction remains open while any of the one or more inner non-persistent sessions remains open.

10. The method of claim 1, wherein each session response, of the one or more inner non-persistent sessions, received from the client comprises a client request to execute one or more user programs on the server as part of the server transaction.

11. A computer system comprising:
    a memory, and
    a process in communication with the memory, wherein the computer system is configured to perform a method, the method comprising:
        receiving from a client a request for server transaction processing, the request being a session request of an outer non-persistent session between the client and a server, the outer non-persistent session comprising the session request by the client and a session response by the server, the session request to initiate the outer non-persistent session and the session response to terminate the outer non-persistent session;
        based on the receiving the session request, commencing processing of a server transaction on the server, the server transaction to be processed in a plurality of transaction portions;
        initiating one or more inner non-persistent sessions between the client and server, each inner non-persistent session of the one or more inner non-persistent sessions comprising (i) a session request, by the server to the client, that initiates the respective inner non-persistent session and provides a response to a client request to process a corresponding first transaction portion of the plurality of transaction portions, and (ii) a session response, received by the server from the client, that terminates the respective inner non-persistent session and provides a client request to process a corresponding second transaction portion of the plurality of transaction portions; and based on termination of a final inner non-persistent session of the one or more inner non-persistent sessions, providing to the client the session response of the outer non-persistent session to terminate the outer non-persistent session.

12. The computer system of claim 11, wherein the outer non-persistent session comprises communication between the client and the server using a first non-persistent communication protocol and at least one inner non-persistent session of the one or more inner non-persistent sessions comprises communication between the client and the server using a second non-persistent communication protocol, wherein the first and second non-persistent communication protocols are a same non-persistent communication protocol or are different non-persistent communication protocols, and at least one of the first non-persistent communication protocols and the second non-persistent communication protocol comprises Hypertext Transfer Protocol (HTTP).

13. The computer system of claim 11, wherein the session response, received by the server from the client, of the final inner non-persistent session provides the client request to process the corresponding second transaction portion of the plurality of transaction portions and comprises a client commit request for the transaction or client rollback request for the transaction, and wherein the session response of the outer non-persistent session provides a response to the client request to process the corresponding second transaction portion and comprises an acknowledgement of a commit of the transaction or a rollback of the transaction.

14. The computer system of claim 11, wherein transaction processing of the transaction remains open while any of the one or more inner non-persistent sessions remains open.

15. The computer system of claim 11, wherein each session response, of the one or more inner non-persistent sessions, received from the client comprises a client request to execute one or more user programs on the server as part of the server transaction.

16. A computer program product comprising:
a non-transitory computer readable storage medium storing instructions for execution to perform a method comprising:
receiving from a client a request for server transaction processing, the request being a session request of an outer non-persistent session between the client and a server, the outer non-persistent session comprising the session request by the client and a session response by the server, the session request to initiate the outer non-persistent session and the session response to terminate the outer non-persistent session;
based on the receiving the session request, commencing processing of a server transaction on the server, the server transaction to be processed in a plurality of transaction portions;
initiating one or more inner non-persistent sessions between the client and server, each inner non-persistent session of the one or more inner non-persistent sessions comprising (i) a session request, by the server to the client, that initiates the respective inner non-persistent session and provides a response to a client request to process a corresponding first transaction portion of the plurality of transaction portions, and (ii) a session response, received by the server from the client, that terminates the respective inner non-persistent session and provides a client request to process a corresponding second transaction portion of the plurality of transaction portions; and based on termination of a final inner non-persistent session of the one or more inner non-persistent sessions, providing to the client the session response of the outer non-persistent session to terminate the outer non-persistent session.

17. The computer program product of claim 16, wherein the outer non-persistent session comprises communication between the client and the server using a first non-persistent communication protocol and at least one inner non-persistent session of the one or more inner non-persistent sessions comprises communication between the client and the server using a second non-persistent communication protocol, wherein the first and second non-persistent communication protocols are a same non-persistent communication protocol or are different non-persistent communication protocols, and at least one of the first non-persistent communication protocols and the second non-persistent communication protocol comprises Hypertext Transfer Protocol (HTTP).

18. The computer program product of claim 16, wherein the session response, received by the server from the client, of the final inner non-persistent session provides the client request to process the corresponding second transaction portion of the plurality of transaction portions and comprises a client commit request for the transaction or client rollback request for the transaction, and wherein the session response of the outer non-persistent session provides a response to the client request to process the corresponding second transaction portion and comprises an acknowledgement of a commit of the transaction or a rollback of the transaction.

19. The computer program product of claim 16, wherein transaction processing of the transaction remains open while any of the one or more inner non-persistent sessions remains open.

20. The computer program product of claim 16, wherein each session response, of the one or more inner non-persistent sessions, received from the client comprises a client request to execute one or more user programs on the server as part of the server transaction.

21. A method comprising:
providing to a server a request for server transaction processing, the request being a session request of an outer non-persistent session between a client and the server, the outer non-persistent session comprising the session request provided to the server, the session request to initiate the outer non-persistent session, and a session response by the server, the session response to terminate the outer non-persistent session;
based on commencement of processing of a server transaction on the server, the server transaction to be processed in a plurality of transaction portions, and for each inner non-persistent session of one or more inner non-persistent sessions between the client and server:
receiving a session request, from the server, that initiates the respective inner non-persistent session and provides a response to a client request to process a corresponding first transaction portion of the plurality of transaction portions; and
providing a session response to the server that terminates the respective inner non-persistent session and provides a client request to process a corresponding second transaction portion of the plurality of transaction portions; and receiving, based on termination of a final inner non-persistent session of the one or more inner non-persistent sessions, from the server the session response of the outer non-persistent session to terminate the outer non-persistent session.

22. A computer system comprising:
a memory, and
a processor in communication with the memory, wherein the computer system is configured to perform a method, the method comprising:
  providing to a server a request for server transaction processing, the request being a session request of an outer non-persistent session between a client and the server, the outer non-persistent session comprising the session request provided to the server, the session request to initiate the outer non-persistent session, and a session response by the server, the session response to terminate the outer non-persistent session;
  based on commencement of processing of a server transaction on the server, the server transaction to be processed in a plurality of transaction portions, and for each inner non-persistent session of one or more inner non-persistent sessions between the client and server:
    receiving a session request, from the server, that initiates the respective inner non-persistent session and provides a response to a client request to process a corresponding first transaction portion of the plurality of transaction portions; and
    providing a session response to the server that terminates the respective inner non-persistent session and provides a client request to process a corresponding second transaction portion of the plurality of transaction portions; and
  receiving, based on termination of a final inner non-persistent session of the one or more inner non-persistent sessions, from the server the session response of the outer non-persistent session to terminate the outer non-persistent session.

23. A computer program product comprising:
a non-transitory computer readable storage medium storing instructions for execution to perform a method comprising:
  providing to a server a request for server transaction processing, the request being a session request of an outer non-persistent session between a client and the server, the outer non-persistent session comprising the session request provided to the server, the session request to initiate the outer non-persistent session, and a session response by the server, the session response to terminate the outer non-persistent session;
  based on commencement of processing of a server transaction on the server, the server transaction to be processed in a plurality of transaction portions, and for each inner non-persistent session of one or more inner non-persistent sessions between the client and server:
    receiving a session request, from the server, that initiates the respective inner non-persistent session and provides a response to a client request to process a corresponding first transaction portion of the plurality of transaction portions; and
    providing a session response to the server that terminates the respective inner non-persistent session and provides a client request to process a corresponding second transaction portion of the plurality of transaction portions; and
  receiving, based on termination of a final inner non-persistent session of the one or more inner non-persistent sessions, from the server the session response of the outer non-persistent session to terminate the outer non-persistent session.

* * * * *